United States Patent [19]

Becker

[11] Patent Number: 4,662,056

[45] Date of Patent: May 5, 1987

[54] METHOD OF AFFIXING ORNAMENTATION SUPPORT MEMBERS TO A CORD-LIKE MEMBER

[76] Inventor: W. Michael Becker, P.O. Box 415, Lafayette, Calif. 94549

[21] Appl. No.: 894,779

[22] Filed: Aug. 8, 1986

Related U.S. Application Data

[62] Division of Ser. No. 567,635, Jan. 3, 1984, abandoned.

[51] Int. Cl.⁴ .................. B21D 39/00; B23P 11/00
[52] U.S. Cl. ............................ 29/509; 29/515; 24/3 C; 24/115 A; 24/129 W; 228/139
[58] Field of Search .............. 29/515, 517, 509, 283.5; 351/123, 156, 157; 24/3 C, 265 A, 265 WS, 129 W, 115 A; 228/135, 139

[56] References Cited

U.S. PATENT DOCUMENTS

| | | | |
|---|---|---|---|
| 745,036 | 11/1903 | Brooks | 24/115 A UX |
| 820,257 | 5/1906 | Remhof | 29/515 X |
| 2,224,943 | 12/1940 | Wheeler | 24/115 A UX |
| 2,319,747 | 5/1943 | Osborne | 24/115 A UX |
| 2,759,256 | 8/1956 | Bergan | 29/515 X |
| 2,879,512 | 3/1959 | Tipper | 29/515 UX |
| 3,030,685 | 4/1962 | Reiter | 24/265 A |
| 3,343,253 | 9/1967 | Omori | 29/515 X |
| 3,611,551 | 10/1971 | Shave et al. | 29/515 |
| 3,969,806 | 7/1976 | McCaughey | 29/515 |
| 3,995,870 | 12/1976 | Hulek | 219/58 |

*Primary Examiner*—Charlie T. Moon
*Attorney, Agent, or Firm*—Limbach, Limbach & Sutton

[57] ABSTRACT

A method and apparatus for affixing ornamentation support members to a cord-like member, wherein the ornamentation support members include a clamp and a tangentially extending base member which is bonded to the clamp. In accordance with the invention, the base member is supported by first support surface means and the legs of the clamp are supported against outward deformation by parallel walls of a channel formed in second support means. The cord-like member is positioned within the clamp. A slide member is provided in the channel which is moveable between a rest position and a crimping position for deforming the legs of the clamp to crimp the legs about the cord-like member.

3 Claims, 11 Drawing Figures

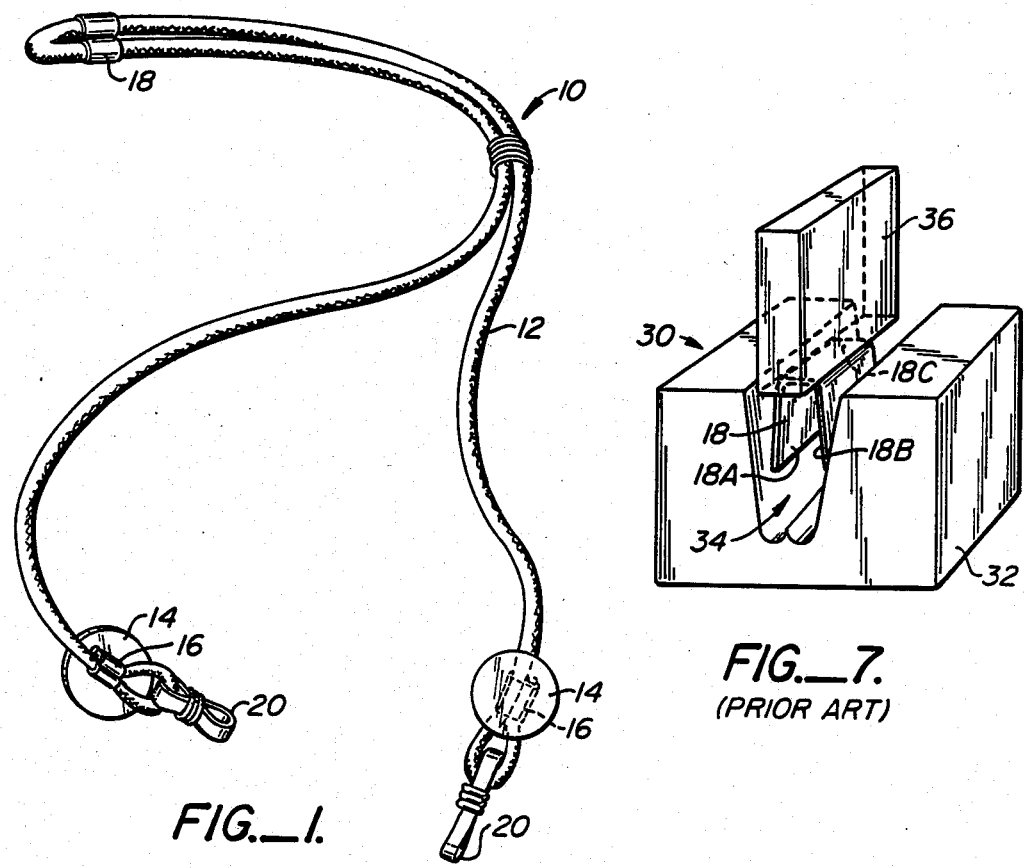
FIG._1.
FIG._7.
(PRIOR ART)
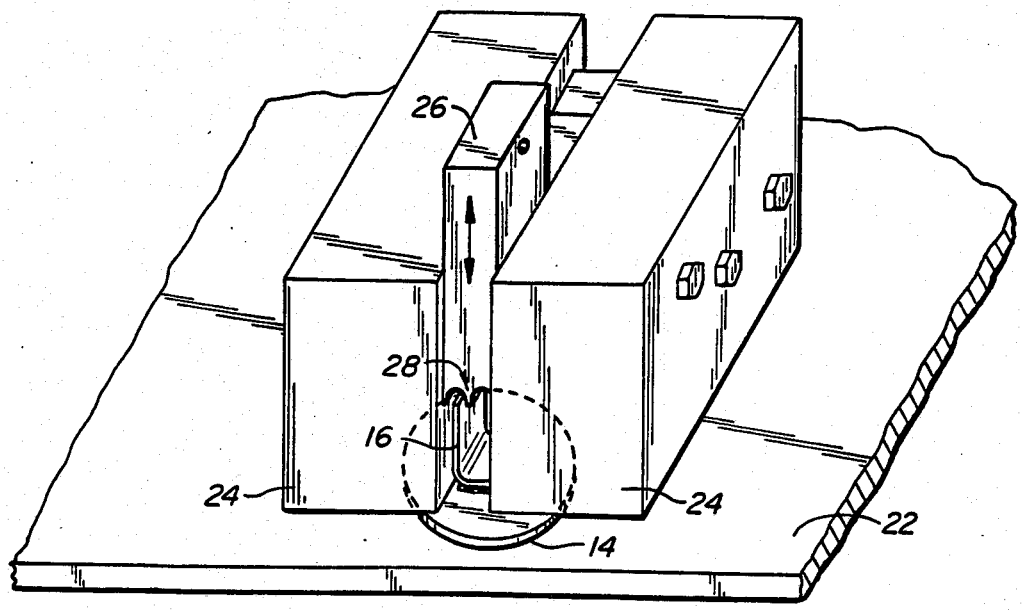
FIG._2.

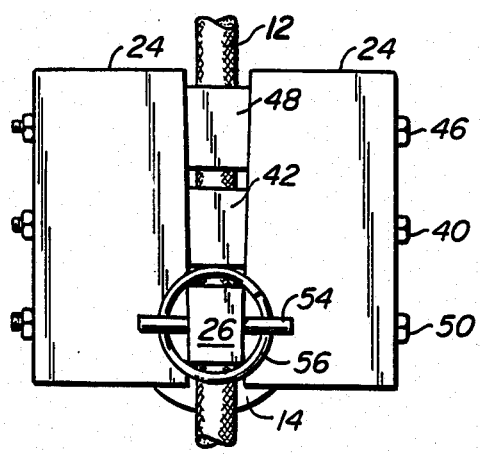
FIG._3C.
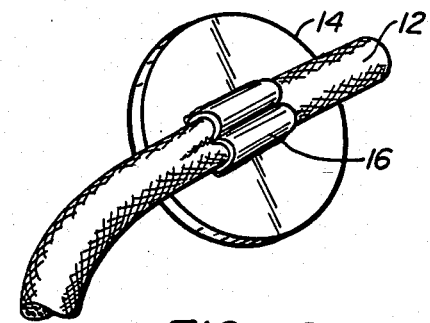
FIG._6.
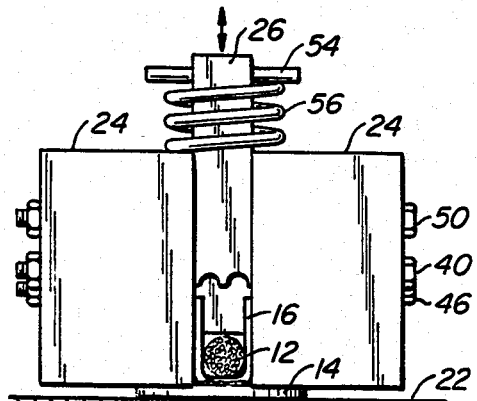
FIG._3B.
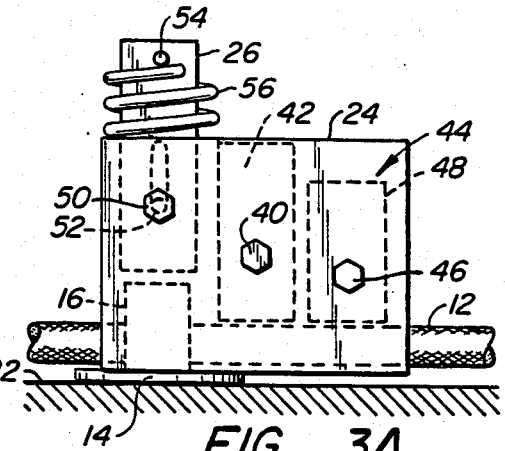
FIG._3A.
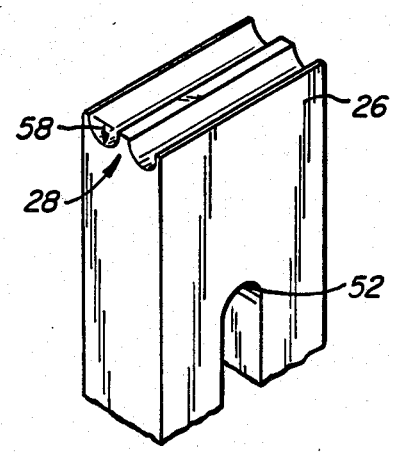
FIG._4.
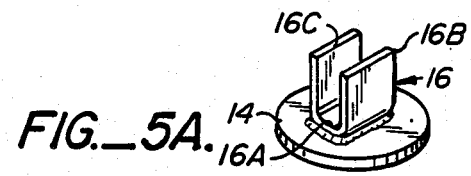
FIG._5A.
FIG._5B.
FIG._5C.

METHOD OF AFFIXING ORNAMENTATION SUPPORT MEMBERS TO A CORD-LIKE MEMBER

This is a division of application Ser. No. 567,635, filed 1.3.84 now abandoned.

TECHNICAL FIELD

The present invention is directed, in general, to a method and apparatus for fastening articles to one another, and more particularly, to a method and apparatus for affixing a planar member, such as a medallion, to a cord-like member, such as an eyeglass leash.

BACKGROUND ART

In the past, cord-like articles, such as eyeglass leashes, have been, to a large degree, devoid of attachments having planar surfaces which are positioned tangentially with respect to the cord portion. This is because the desired tangential orientation of the planar surface interferes with conventional clamping or crimping techniques. In the past, sleeves have been crimped to eyeglass leashes through the use of a crimping structure having a deep channel into which a "U"-shaped clamp has been positioned, open end down. The channel includes first and second walls which are slanted with respect to one another so as to be closest to each other at the bottom of the channel and furthest apart at the top of the channel. The bottom of the channel is configured to have a "W"-shaped contour. In operation, a moveable piston is positioned against the closed end of the clamp, which has been positioned in the channel, and applies a downward force to push the clamp into the channel. The legs of the clamp, positioned against the slanting walls of the channel, are caused to move gradually towards each other. When the legs of the clamp come into contact with the "W"-shaped contour of the bottom of the channel, the legs are further turned inwardly and then upwardly. One disadvantage of such an arrangement is that as the clamp is pushed further into the channel by the piston or the like, any planar surfaces attached tangentially to the closed portion of the clamp, such as a medallion, would interfere with the movement of the clamp into the channel.

Other attempts at fastening medallions or the like on an eyeglass leash have included first, the crimping of the sleeve onto the leash and then the gluing of the medallion onto the sleeve. This technique has the disadvantage of a weak bond between the sleeve and the medallion. Typically, the bond offered by glue or the like has a low shear strength. As such, the medallion will separate from the sleeve after a small amount of use.

Ideally, the medallion or other member having planar surfaces will be soldered or welded onto the sleeve prior to attachment to the leash. Heretofore, no satisfactory method and apparatus for attaching a prebonded clamp to a cord-like member has existed.

SUMMARY OF THE INVENTION

These and other problems of prior methods and apparatus for attaching ornamentation support members, having planar or outwardly extending surfaces, in a tangential orientation onto cord-like members are overcome by the present invention. Preferably the ornamentation support members include a "U"-shaped clamp having an opened end and a closed end, which clamp is bonded at its closed end to the ornamentation support member. In one embodiment the present invention is used in conjunction with a pressure source, such as a press, and a supporting base. The ornamentation support members are positioned on the supporting base and the present invention is positioned over the clamp portion. The present invention comprises means for supporting the legs of the "U"-shaped clamp against outward deformation, and means, configured for movement with respect to the supporting base and the leg supporting means between first and second positions, for deforming the legs of the "U"-shaped clamp inwardly and toward the closed end of the "U"-shaped clamp when moved between said first and second positions, so that the "U"-shaped clamp can be crimped about the cord-like member without dislodging the planar surface member therefrom.

In accordance with the present invention, an eyeglass leash or other cord-like article can be provided having planar display members which are positioned tangentially with respect to the cord-like member.

It is therefore an object of the present invention to provide a method and apparatus for attaching display surface members to cord-like articles so that said display surface members can be positioned tangentially with respect to the cord-like member.

It is another object of the present invention to provide an eyeglass leash having display members positioned tangentially with respect to the leash portion thereof.

It is a further object of the present invention to provide an apparatus for attaching a planar display surface member having a "U"-shaped clamp to a cord-like member, including means for suoporting the planar surface of the display surface member and for supporting the legs of the clamp, and means for deforming the legs of the clamp inwardly and toward the closed end of the clamp, which deforming means moves relative to the supporting means.

These and other objectives, features and advantages of the present invention will be more readily understood upon consideration of the following detailed description of certain preferred embodiments of the invention and the accompanying drawings.

BRIEF DESCRIPTION OF THE DRAWING

FIG. 1 illustrates a typical eyeglass leash having display surface portions attached in accordance with the present invention.

FIG. 2 is a generalized illustration of the structure of the present invention.

FIGS. 3A, 3B and 3C are simplified side, front and top views of the present invention, respectively.

FIG. 4 is a more detailed illustration of the forming surface of the moveable slide of the present invention.

FIGS. 5A, 5B and 5C illustrate the deformation of the clamp portion, which is obtained in accordance with the present invention.

FIG. 6 illustrates the orientation of the display surface member and the clamp member with respect to the cord-like member.

FIG. 7 illustrates a conventional apparatus for attaching a sleeve to the cord-like member.

DETAILED DESCRIPTION

Referring to FIG. 1, there is shown an eyeglass leash 10 having a cord-like portion 12 and planar surface members, such as medallions 14, fastened to the cord-like member 12 in accordance with the present invention. As can be seen from the figure the planar surface members are positioned tangentially with respect to the cord-like member 12 and have a width which is large with respect to the diameter of the cord-like member so as to extend outwardly from the cord-like member 12. The medallions are prebonded to "U"-shaped clamps 16 prior to being fastened to the cord-like member 12. Also shown is a sleeve 18 which has been fastened to the cord-like member 12 in the conventional manner. Also shown are coupling pieces 20 which are used to attach the eyeglass leash 10 to the arms of a pair of eyeglasses (not shown).

Referring to FIG. 7, a structure which has been used in the past to attach sleeves to cord-like members is shown. The structure 30 includes a block 32 having a channel 34. The portion of the channel which opens to a surface of the block 32 is wider than the bottom of the channel. The bottom of the channel is "W"-shaped. The walls of the channel are slanted so that their separation from one another is greatest at the top of the channel and smallest at the bottom of the channel.

An uncrimped sleeve 18 is shown positioned in channel 34. In operation, a plunger 36 is brought down upon the top 18C of sleeve 18 to cause the sleeve to move toward the bottom of channel 34. The slanting of the walls of channel 34 cause the legs 18A and 18B of sleeve 18 to move toward one another. As sleeve 18 makes contact with the bottom of channel 34, the legs 18A and 18B are turned inwardly and upward to crimp around whatever material has been placed within sleeve 18.

An immediately apparent disadvantage of this prior arrangement is that it cannot be used to crimp the sleeve 18 whenever the sleeve also includes surfaces which protrude transversely with respect to the top 18C of the sleeve 18. This is because such protrusions would interfere with the movement of sleeve 18 into channel 34.

Referring to FIG. 2, the apparatus of the present invention is shown in simplified form. A medallion 14 is shown supported on a planar support surface 22. Surface 22 can be the base of an arbor press, for example. Uncrimped clamp member 16, which has been bonded to the medallion 14, is shown positioned between leg support members 24. Leg support members 24 remain stationary with respect to planar support surface 22 during the operation of the apparatus. A slide 26 is shown positioned between leg support members 24 and moveable with respect thereto. The slide 26 includes a forming surface 28 which has been contoured to have a "W"-like shape. Leg support members 24 preferably provide parallel surfaces which form a channel for supporting the legs of clamp 16. This can be seen in FIG. 2.

In operation, the medallion 14 is positioned on surface 22 so that uncrimped clamp 16 is disposed within the channel formed by leg support members 24. Slide 26 is caused to move toward medallion 14. As it does so, forming surface 28 engages the ends of the legs of clamp 16. The ends of the legs move along the contour of forming surface 26 and are turned inwardly and downward toward the medallion 14. Support surface 22 provides support to the medallion 14 against the downward forces from slide 26, while support members 24 provide support against outward deformation of legs of clamp member 16.

The typical source of the force applied to the slide 26 is an arbor press, or the like.

Referring to FIGS. 3A, 3B and 3C, the apparatus of the present invention will be described in greater detail. FIG. 3A shows a side view of the present invention. Leg support members are joined together via fastener 40 and spacer 42. From FIG. 3C, it can be seen that fastener 40 can be a bolt and nut combination which extends through support members 24 and spacer 42.

Biasing means 44 are provided to permit adjustment of the spacing between support members 24. Preferably, biasing means 44 include a fastening member 46 and spacer 48. Spacer 48 has a smaller width than spacer 42 so that the spacing of support members in the vicinity of biasing means 44 can be adjusted to be less than the spacing at spacer 42. This causes the spacing in the vicinity of slide 26 to be slightly greater than that at spacer 42. Slide 26 is shown positioned between support members 24 by way of fastener 50. Fastener 50 passes through an elongated slot 52 in slide 26 which permits slide 26 to move relative to fastener 50.

FIG. 3B is a front view of the apparatus of the present invention. There it can be seen that slide 26 includes a transverse retaining pin 54 and a biasing spring 56. Retaining pin 54 maintains the spring 56 about slide 26 and also limits the downward travel of slide 26 when force is applied thereto, by an arbor press, for example.

In the preferred embodiment of the present invention, spacer 42 is approximately 0.2 inches wide, the width of the slide is approximately 0.184 inches, and the width of the channel is approximately 0.192 inches. In a rest position, slide 26 is positioned so that contoured surface 28 is 0.4 inches from the bottom of support members 24. The material of slide 26 is preferably tooling steel. A typical amount of force applied to slide 26, where the base material of clamp 16 is brass, is approximately 1000 lbs. per square inch.

Referring to FIG. 4, the contoured surface 28 of slide 26 is shown in greater detail. As described above, contoured surface 28 has a "W"-like cross-section. The surface is constructed by forming parallel longitudinal grooves in one end of slide 26. Preferably, the grooves have a radius of curvature 58 which is approximately 0.046 inches. It has been discovered that a ratio of approximately 4:1 between the radius of curvature of the grooves and the width of the slide yields optimal crimping.

In construction, fastener 40 is tightened to compress support members 24 together about spacer 42. Slide 26 is moveably positioned between support members 24 for movement about fastener 50. Fastener 46 is adjusted so that the separation of support members 24 in the vicinity of slide 26 is large enough to permit slide 26 to slide freely about fastener 50 but not so large as to permit excessive lateral movement of slide 26 with respect to support members 24.

Thereafter, medallion 14 is supported on support surface 22 so that the legs of clamp 16 extend into the space between support members 24. Cord-like member 12 is positioned to rest upon the closed end of 16A of clamp 16 so that legs 16B and 16C extend toward contour surface 28 of slide 26.

FIGS. 5A, 5B and 5C illustrate the stages of crimping, starting at the uncrimped stage, the partially crimped stage where the legs are being turned inwardly and toward the closed end of the clamp, and fully crimped stage, respectively. FIG. 6 illustrates the clamp 16 when it is fully crimped about cord-like member 12.

From FIG. 6, it can be seen that the structure and method of the present invention permit the affixing of planar articles, in a tangential manner, to a cord-like member. Heretofore, this has not been possible. As such, the present invention can permit a wide variety of articles to be attached to cord-like members. The articles include medallions having display surfaces bearing instructional or identifying information, ornamentation or the like. Possible shapes include round or oval shapes. An additional advantage is that clamp 16 can now be prebonded to the article 14 to permit a stronger bond. For example, soldering can be used where the clamp and medallion are made of metal.

It is to be understood that although the present invention has been described in the context of an eyeglass leash, its teaching can be applied to fastening planar articles to other cord-like members such as cables, rope, string and the like.

It is also to be understood that the dimensions provided for the preferred embodiment, while having been found to be particularly suitable for use with clamps having legs approximately 0.210 inches high and a closed end of approximately 0.185 inches in width, for clamps of other dimensions, the preferred apparatus dimension should be adjusted accordingly.

In accordance with the present invention, it has been found that contrary to prior belief, the slide 26 need move only a short distance, e.g., 0.4 inches, in order to obtain satisfactory crimping of clamp 16 as described above. In the past, a long-travel slide has been used to crimp sleeves to cord-like members.

The terms and expressions which have been employed here are used as terms of description and not of limitation, and there is no intention, in the use of such terms and expressions, of excluding equivalents of the features shown and described or portions thereof, it being recognized that various modifications are possible within the scope of the invention claimed.

I claim:

1. A method of attaching ornamentation support means to a cord-like member such that said ornamentation support means are positioned tangentially with respect to the cord-like member, wherein such ornamentation support means includes a base member which extends outwardly beyond the cord-like material, comprising the steps of
    a. prebonding the base member to a closed end of a "U"-shaped clamp, said clamp being further defined by crimpable legs extending outwardly from said closed ends;
    b. supporting said base member at the surface opposite the surface to which the clamp is bonded;
    c. positioning said cord-like material within said clamp; and
    d. applying force to ends of the legs of the clamp while supporting outer surfaces of the legs of said clamp to crimp the clamp legs toward each other and about the cord-like member.

2. The method of claim 1 wherein step "d" includes the steps of
    i. supporting the outer surfaces of the legs of the clamp in a parallel-walled channel; and
    ii. advancing a slide member onto the free-ends of the legs of the clamp, said slide member having a "W"-shaped contour so that said legs of the clamp are bent inwardly and downward onto the cord-like material to encompass the cord-like member.

3. The method of claim 1 wherein step "d" includes the steps of
    i. maintaining the display surface means and closed end of the clamp stationary; and
    ii. deforming the legs of the clamp to cause movement of said legs so that said legs collapse inwardly relative to the closed end of the clamp.

* * * * *